(12) United States Patent
Liu

(10) Patent No.: US 10,832,032 B2
(45) Date of Patent: Nov. 10, 2020

(54) FACIAL RECOGNITION METHOD, FACIAL RECOGNITION SYSTEM, AND NON-TRANSITORY RECORDING MEDIUM

(71) Applicant: BEIJING KUANGSHI TECHNOLOGY CO., LTD., Beijing (CN)

(72) Inventor: Yu Liu, Beijing (CN)

(73) Assignee: BEIJING KUANGSHI TECHNOLOGY CO., LTD., Beijing (CN)

( * ) Notice: Subject to any disclaimer, the term of this patent is extended or adjusted under 35 U.S.C. 154(b) by 101 days.

(21) Appl. No.: 16/202,975

(22) Filed: Nov. 28, 2018

(65) Prior Publication Data
US 2019/0236336 A1   Aug. 1, 2019

(30) Foreign Application Priority Data
Jan. 29, 2018 (CN) .......................... 2018 1 0084836

(51) Int. Cl.
*G06F 17/11* (2006.01)
*G06K 9/00* (2006.01)
*G06K 9/62* (2006.01)

(52) U.S. Cl.
CPC .......... *G06K 9/00261* (2013.01); *G06F 17/11* (2013.01); *G06K 9/00288* (2013.01); *G06K 9/6215* (2013.01); *G06K 9/6271* (2013.01)

(58) Field of Classification Search
None
See application file for complete search history.

(56) References Cited

U.S. PATENT DOCUMENTS

| 8,471,889 B1 | 6/2013 | Lee et al. |
| 2007/0086627 A1* | 4/2007 | Kim ................... G06K 9/00288 382/118 |
| 2019/0042866 A1* | 2/2019 | Mostafa ............. G06K 9/00926 |

FOREIGN PATENT DOCUMENTS

| CN | 104899579 | 9/2015 |
| CN | 105095856 | 11/2015 |

(Continued)

OTHER PUBLICATIONS

First Chinese Office Action, issued in the corresponding Chinese patent application No. 201810084836.2, dated Mar. 17, 2020, 17 pages.

*Primary Examiner* — Dov Popovici
(74) *Attorney, Agent, or Firm* — Hamre, Schumann, Mueller & Larson, P.C.

(57) ABSTRACT

The embodiments of this application provide a facial recognition method and system, and a non-transitory recording medium. The method includes: obtaining a first feature vector of a first face in a first facial image and a first confidence vector having the same dimension as the first feature vector, wherein elements in the first confidence vector are used to indicate credibility of features represented by the corresponding elements in the first feature vector; obtaining a second feature vector of a second face in a second facial image and a second confidence vector having the same dimension as the second feature vector, wherein elements in the second confidence vector are used to indicate credibility of features represented by the corresponding elements in the second feature vector; and determining the first confidence vector, the second feature vector and the second confidence vector, whether the first and second face belong to the same person.

17 Claims, 4 Drawing Sheets

```
┌────────────────────────────────────────────────────────────┐
│ Obtaining a first feature vector of a first face in a first facial image │
│ and a first confidence vector having the same dimension as the first │
│ feature vector, wherein elements in the first confidence vector are │ S110
│ used to indicate credibility of features represented by the        │
│ corresponding elements in the first feature vector                 │
└────────────────────────────────────────────────────────────┘
                              │
┌────────────────────────────────────────────────────────────┐
│ Obtaining a second feature vector of a second face in a second facial │
│ image and a second confidence vector having the same dimension as │
│ the second feature vector, wherein elements in the second confidence │ S120
│ vector are used to indicate credibility of features represented by the │
│ corresponding elements in the second feature vector                │
└────────────────────────────────────────────────────────────┘
                              │
┌────────────────────────────────────────────────────────────┐
│ Determining, according to the first feature vector, the first confidence │
│ vector, the second feature vector and the second confidence vector,  │ S130
│ whether the first face and the second face belong to the same person │
└────────────────────────────────────────────────────────────┘
```

(56) References Cited

FOREIGN PATENT DOCUMENTS

| | | |
|---|---|---|
| CN | 106803067 | 6/2017 |
| CN | 106815566 | 6/2017 |
| CN | 107292287 | 10/2017 |

* cited by examiner

FACIAL RECOGNITION METHOD, FACIAL RECOGNITION SYSTEM, AND NON-TRANSITORY RECORDING MEDIUM

CROSS-REFERENCE TO RELATED APPLICATION

The present application claims the priority of Chinese patent application No. 201810084836.2 filed on Jan. 29, 2018, the disclosure of which is incorporated herein by reference in its entirety.

TECHNICAL FIELD

The present disclosure relates to the field of image processing, and more particularly, to a facial recognition method, a facial recognition system, and a non-transitory recording medium.

BACKGROUND

In the field of facial recognition, it is usually necessary to determine whether two faces belong to the same person. Specifically, the determination is made by extracting features from the faces and performing comparison. However, due to the possibility of face occlusion or the like, noise of the extracted features may be too large, which further results in a low recognition accuracy.

SUMMARY

The present disclosure provides a facial recognition method, a facial recognition system, and a non-transitory recording medium, which achieve a high recognition accuracy even for occluded faces.

According to an aspect of the present disclosure, there is provided a facial recognition method, the method comprising:

obtaining a first feature vector of a first face in a first facial image and a first confidence vector having the same dimension as the first feature vector, wherein elements in the first confidence vector are used to indicate credibility of features represented by the corresponding elements in the first feature vector;

obtaining a second feature vector of a second face in a second facial image and a second confidence vector having the same dimension as the second feature vector, wherein elements in the second confidence vector are used to indicate credibility of features represented by the corresponding elements in the second feature vector; and determining, according to the first feature vector, the first confidence vector, the second feature vector and the second confidence vector, whether the first face and the second face belong to the same person.

According to another aspect of the present disclosure, there is provided an apparatus for facial recognition, the apparatus is for carrying out steps of the method according to the aspects described above or the respective embodiments, the apparatus comprising:

an obtaining module configured to obtain a first feature vector of a first face in a first facial image and a first confidence vector having the same dimension as the first feature vector, wherein elements in the first confidence vector are used to indicate credibility of features represented by the corresponding elements in the first feature vector;

the obtaining module being further configured to obtain a second feature vector of a second face in a second facial image and a second confidence vector having the same dimension as the second feature vector, wherein elements in the second confidence vector are used to indicate credibility of features represented by the corresponding elements in the second feature vector; and a calculating module configured to determine, according to the first feature vector, the first confidence vector, the second feature vector and the second confidence vector, whether the first face and the second face belong to the same person.

According to yet another aspect of the present disclosure, there is provided a facial recognition system, comprising a memory, a processor, and a computer program stored in the memory and running on the processor, wherein steps of the facial recognition method according to the aspects described above or the respective examples are carried out when the processor executes the computer program.

According to still yet another aspect of the present disclosure, there is provided a non-transitory recording medium on which a computer program is stored, wherein steps of the facial recognition method according to the aspects described above or the respective examples are carried out when the computer program is executed by a processor.

Accordingly, in the embodiments of the present disclosure, credibility of respective elements in the corresponding feature vector can be represented by the confidence vector, and further, similarity between two faces can be jointly calculated based on the feature vector and the confidence vector, which can avoid the feature vector unavailability situation caused by face occlusion, and the similarity obtained by this method is independent of the occlusion state, thereby ensuring the accuracy of facial recognition.

BRIEF DESCRIPTION OF THE DRAWINGS

Through the more detailed description of embodiments of the present disclosure with reference to the accompanying drawings, the above and other objectives, features, and advantages of the present disclosure will become more apparent. The drawings are to provide further understanding for the embodiments of the present disclosure and constitute a portion of the specification, and are intended to interpret the present disclosure together with the embodiments rather than to limit the present disclosure. In the drawings, the same reference sign generally refers to the same component or step.

DETAILED DESCRIPTION OF THE EMBODIMENTS

To make the objectives, technical solutions, and advantages of the present disclosure more clear, exemplary embodiments of the present disclosure will be described in detail with reference to the accompanying drawings. Obviously, these described embodiments merely are only part of the embodiments of the present disclosure, rather than all of the embodiments of the present disclosure, it should be understood that, the present disclosure is not limited to the exemplary embodiments described herein. All other embodiments obtained by a person skilled in the art based on the embodiments described in the present disclosure without paying inventive efforts should all fall into the protection scope of the present disclosure.

Figure 1:
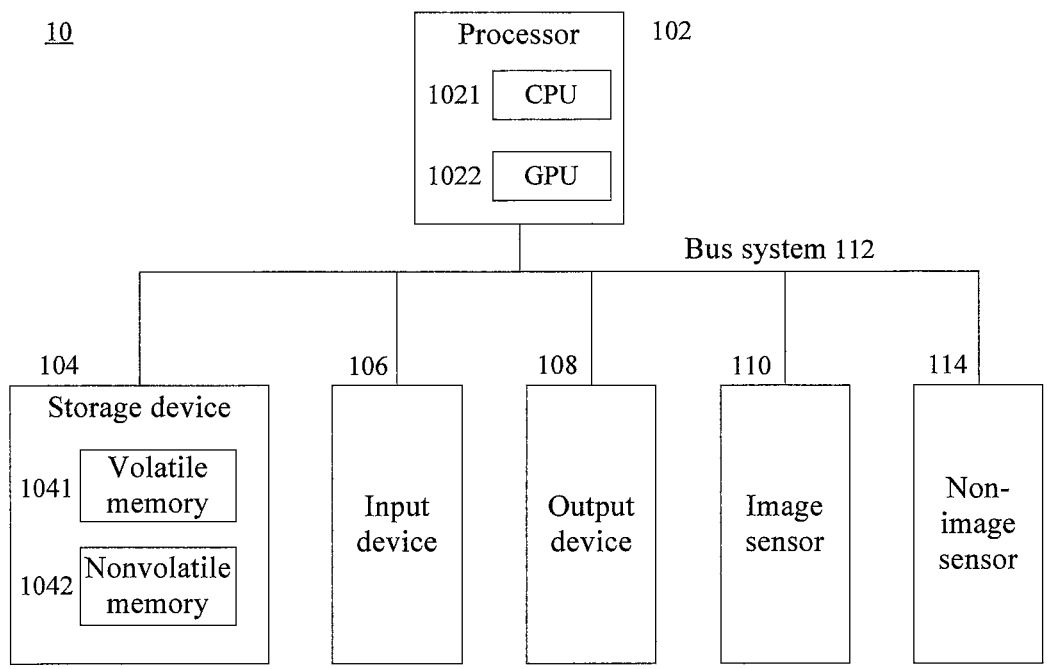
FIG. 1 is a schematic block diagram of an electronic device according to an embodiment of the present disclosure.

The embodiments of the present disclosure may be applied to an electronic device. FIG. 1 shows a schematic block diagram of an electronic device according to an embodiment of the present disclosure. The electronic device 10 shown in FIG. 1 comprises one or more processors 102, one or more storage devices 104, an input device 106, an output device 108, an image sensor 110 and one or more non-image sensors 114, these components are interconnected through a bus system 112 and/or other forms. It should be noted that, components and structures of the electronic device 10 shown in FIG. 1 are merely exemplary, not restrictive, and the electronic device may have other components and structures as needed.

The processor 102 may include a central processing unit (CPU) 1021 and a graphics processing unit (GPU) 1022 or other forms of processing unit with data processing capability and/or instruction execution capability, such as Field-Programmable Gate Array (FPGA) or Advanced RISC (Reduced Instruction Set Computer) Machine (ARM), and the processor 102 can control other components in the electronic device 10 to perform desired functions.

The storage device 104 may include one or more computer program products, said computer program products may include various forms of computer-readable storage medium, such as a volatile memory 1041 and/or a nonvolatile memory 1042. The volatile memory 1041 may include, for example, a random access memory (RAM) and/or a cache or the like. The nonvolatile memory 1042 may include, for example, a read only memory (ROM), a hard disk, a flash memory or the like. One or more computer program instructions may be stored on the computer-readable storage medium, and the processor 102 may execute the program instructions to implement various desired functions. Various application programs and various data may also be stored in the computer-readable storage medium, such as various data used and/or generated by the application programs or the like.

The input device 106 may be a device used by a user to input an instruction, and may include one or more of a keyboard, a mouse, a microphone, a touch screen or the like.

The output device 108 may output various types of information (e.g., image or sound) to the outside (e.g., a user), and may include one or more of a display, a speaker or the like.

The image sensor 110 may capture images (e.g., photos, videos, etc.) desired by the user and store the captured images in the storage device 104 for use by other components.

It should be noted that, the components and structures of the electronic device 10 illustrated in FIG. 1 are merely exemplary, although the electronic device 10 illustrated in FIG. 1 includes a plurality of different devices, some of them may not be necessary as desired, wherein the number of some devices may be more, etc., and the present disclosure is not limited thereto.

Figure 2:
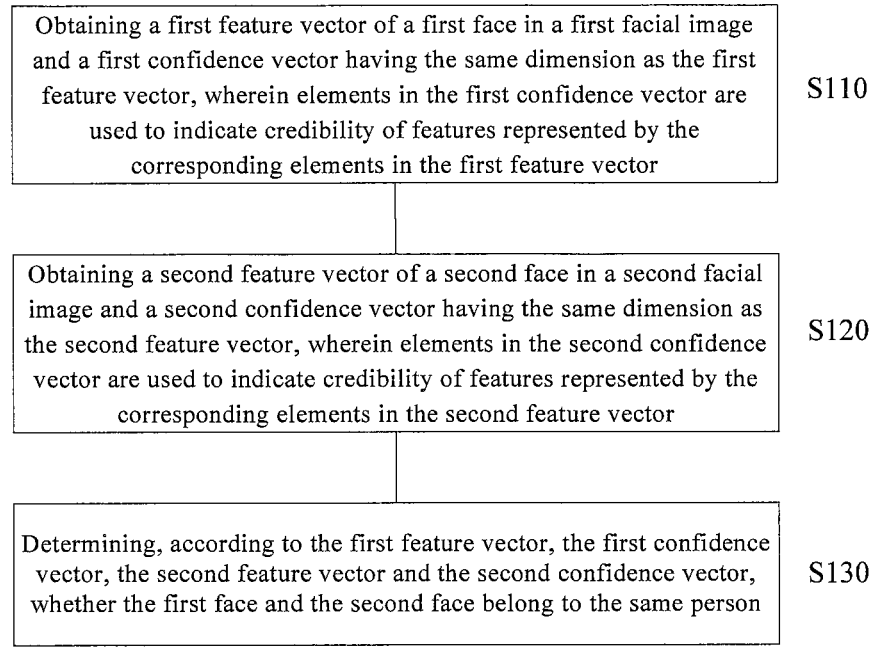
FIG. 2 is a schematic flowchart of a facial recognition method according to an embodiment of the present disclosure.

FIG. 2 is a schematic flowchart of a schematic flowchart of a facial recognition method according to an embodiment of the present disclosure, the method shown in FIG. 2 comprises:

S101, obtaining a first feature vector of a first face in a first facial image and a first confidence vector having the same dimension as the first feature vector, wherein elements in the first confidence vector are used to indicate credibility of features represented by the corresponding elements in the first feature vector;

S102, obtaining a second feature vector of a second face in a second facial image and a second confidence vector having the same dimension as the second feature vector, wherein elements in the second confidence vector are used to indicate credibility of features represented by the corresponding elements in the second feature vector; and S103, determining, according to the first feature vector, the first confidence vector, the second feature vector and the second confidence vector, whether the first face and the second face belong to the same person.

Exemplarily, the embodiment of the present disclosure makes no limitation to the execution order of S110 and S120, and they may be performed, for example, in parallel.

Exemplarily, the method shown in FIG. 2 may further comprise: obtaining a first facial image and a second facial image. The first facial image and the second facial image may be original images that include a face captured by an image acquisition device, or may be facial images after going through image preprocessing (such as denoising, normalization, etc.). For example, the first facial image and the second facial image are captured using the image acquisition device, or the first facial image and the second facial image are obtained from a memory, or the first facial image is captured using the image acquisition device, while the second facial image is obtained from the memory (e.g., the second facial image is a database image).

Exemplarily, S110 and S120 may be performed by a trained neural network. Specifically, the first facial image may be inputted to the trained neural network to obtain the first feature vector and the first confidence vector. The second facial image may be inputted to the trained neural network to obtain the second feature vector and the second confidence vector.

It can be understood that, before S110, the method further comprise: obtaining the neural network by training. Specifically, a face sample image data set may be constructed, wherein at least part of the sample images in the data set may have annotation information including a face feature vector and a corresponding confidence vector. Optionally, the existing feature extraction neural network may be used to obtain the face feature vector of each sample image, and the corresponding confidence vector may be marked based on the face condition (such as the face occlusion situation) in each sample image. The sample images in the data set are inputted to the neural network to be trained, and an error between the output information of the neural network and the annotation information is optimized by adjusting parameters of the neural network to train the neural network.

Herein, the data set may include sample images having various face occlusion states, such as partial occlusion of the face due to hats, glasses, masks, masks, hands, or other objects.

The error can be optimized based on the gradient descent method. Illustratively, during training, a loss function may be constructed to determine if it has converged. As an example, if training is performed using a triplet loss function (Triplet Loss), for the inputted three images A1, A2, and A3, the loss function may be defined as a difference between a distance based on images A1 and A3 and a distance based on images A1 and A2, this loss function may be expressed as L=D(A1, A3)−D(A1, A2)). Herein, the distance D(A1, A3)

based on images A1 and A3 is calculated according to the feature vector and the confidence vector of A1 as outputted by the neural network and the feature vector and the confidence vector of A3 as outputted by the neural network; the distance D (A1, A2) based on images A1 and A2 is calculated based on the feature vector and the confidence vector of A1 as outputted by the neural network and the feature vector and the confidence vector of A2 as outputted by the neural network. For details on how to calculate the distance, reference may be made to the following description of this specification, which will not be described in detail here.

It can be understood that, the loss function may also be other forms defined according to the output of the neural network, the present disclosure makes no limitations thereto.

The embodiment of the present invention makes no limitation to the network structure of the neural network adopted, and it may be any network structure such as ResNet, DenseNet, MobileNet, ShuffleNet, and Inception.

Exemplarily, other machine learning methods may also be used to implement S110 and S120, that is, other machine learning methods may also be used to acquire the first feature vector and the first confidence vector of the first face and the second feature vector and the second confidence vector of the second face. The embodiment of the present disclosure makes no limitation thereto.

The first feature vector and the first confidence vector have the same dimension, which is assumed to be N. Then a certain element of the first confidence vector represents confidence of the element of the first feature vector at the same position. Specifically, it is assumed that the first feature vector is represented as X1 and the first confidence vector is represented as Y1, the i-th element $y1_i$ of Y1 represents confidence of the i-th element $x1_i$ of X1, and the confidence may also be referred to as credibility, it indicates a probability of that the corresponding element is an authentic feature of human face. For example, $x1_i$ indicates a feature at the i-th position in the first facial image, and $y1_i=1$ indicates that the feature is a feature on the first face in the first facial image, that is, the i-th position is a facial position without occlusion; $y1_i=0$ indicates that the feature $x1_i$ is not a feature on the first face in the first facial image, that is, the feature $x1_i$ is a feature of the occlusion on the first face, that is, the i-th position is the facial position where the occlusion is present. It should be understood that, the first feature vector and the first confidence vector are both real vectors, that is, each element is a real number; and each element of Y1 is a value within the range [0, 1].

Similarly, the second feature vector and the corresponding second confidence vector also have the same dimension, which is assumed to be N. Then a certain element of the second confidence vector represents confidence of the element of the second feature vector at the same position. Specifically, it is assumed that the second feature vector is represented as X2 and the second confidence vector is represented as Y2, the i-th element $y2_i$ of Y2 represents confidence of the i-th element $x2_i$ of X2, and the confidence may also be referred to as credibility, it indicates a probability of that the corresponding element is an authentic feature of human face. It should be understood that, the second feature vector and the second confidence vector are both real vectors, that is, each element is a real number; and each element of Y2 is a value within the range [0, 1].

In addition, the confidence vector may also be understood as representing a noise magnitude of the corresponding feature vector. Specifically, the smaller a certain element of the confidence vector is, the greater the noise of the element at the same position of the corresponding feature vector is.

Further, in S130, whether the first face and the second face have comparability may be determined according to the first confidence vector and the second confidence vector; if it is determined as having comparability, the similarity between the first face and the second face may be further calculated according to the first feature vector and the second feature vector, otherwise the facial recognition process is stopped or the scenario is renewed and S110 and S120 are re-executed. Herein, not having comparability means that there is no need to calculate the similarity between the first face and the second face, in this case, even if the similarity between the first face and the second face is calculated by some method, the calculated similarity has no reference value for facial recognition; that is, not having comparability means that it is impossible to determine whether the first face and the second face belong to the same person. Having comparability means that the similarity between the first face and the second face can be further calculated, and used to determine whether the two belong to the same person.

Exemplarily, whether there is comparability may be determined according to a degree of coincidence of the first confidence vector and the second confidence vector. Optionally, a degree of coincidence in credibility dimensions of two confidence vectors may be determined by calculating an inner product of the two confidence vectors.

It can be seen that, the embodiment of the present disclosure can determine whether there is comparability according to two confidence vectors, which can avoid inaccuracy of a recognition result due to having no comparability.

Optionally, it is possible to calculate a degree of coincidence between the first confidence vector and the second confidence vector; if the degree of coincidence is less than a preset threshold, it is determined that it is impossible to determine whether the first face and the second face belong to the same person; if the degree of coincidence is greater than or equal to the preset threshold, a similarity between the first face and the second face is calculated according to the first confidence vector, the first feature vector, the second confidence vector and the second feature vector, and whether the first face and the second face belong to the same person is determined according to the similarity.

As an example, if the element in the confidence vector takes a value of 0 or 1, the degree of coincidence of two confidence vectors refers to an amount of the same positions whose values are all 1; or, the inner product of two confidence vectors may be calculated to obtain the degree of coincidence. As another example, if the elements in the confidence vector take the value [0, 1], the inner product of two confidence vectors may be calculated to obtain the degree of coincidence. The inner product calculation of vectors means that the corresponding elements are multiplied and then summed, it is assumed that the first confidence vector is represented as Y1, the second confidence vector is represented as Y2, and dimensions of both of them are N, then the calculated inner product is:

$$\sum_{i=1}^{N} y1_i \times y2_i,$$

where $y1_i$ represents the i-th element of Y1, and $y2_i$ represents the i-th element of Y2.

The preset threshold may be an empirical value, it may be adjusted according to scenarios, the present disclosure makes no limitations thereto.

Optionally, calculating a similarity between the first face and the second face according to the first confidence vector, the first feature vector, the second confidence vector and the second feature vector may comprise: calculating a distance between the first face and the second face according to the first confidence vector, the first feature vector, the second confidence vector and the second feature vector; and calculating a similarity between the first face and the second face according to the distance.

As an example, the calculated distance may be directly used as the similarity.

As another example, the similarity may be calculated based on the obtained distance. For example, the similarity may be calculated by using the following formula:

$$S = \frac{1}{1 + e^{A \times D + B}}$$

where S represents the similarity, D represents the distance, and A and B are preset parameters. A and B may be fixed parameters obtained empirically, and the present disclosure makes no limitation thereto.

Optionally, the calculated distance may be referred to as a distance based on the first facial image and the second facial image. The distance may be calculated according to the first feature vector, the first confidence vector, the second feature vector and the second confidence vector. When calculating the distance, since the factor "confidence" is considered at the same time, the finally calculated distance can be independent of the occlusion state of the first face and the second face, thereby making the result of facial recognition more accurate.

Specifically, the distance between the first feature vector and the second feature vector may be calculated by the following formula:

$$D = \frac{<(X1 - X2)*Y1, (X1 - X2)*Y2>}{<Y1, Y2>}.$$

Herein, X1 represents the first feature vector, X2 represents the second feature vector, Y1 represents the first confidence vector, Y2 represents the second confidence vector, < > represents calculating an inner product, and * represents multiplying by bit. Multiplying by bit means multiplying the elements at the same position of the two vectors. For example, M=M1*M2, $M_i = M1_i \times M2_i$ is satisfied, where $M_i$, $M1_i$, $M2_i$ represent the i-th element of M, M1 and M2.

Illustratively, the above formula may also be expressed as $$D = \frac{K1 \cdot K2}{Y1 \cdot Y2},$$

where K1, K2, Y1, Y2 are vectors in the same dimension, K1·K2 represents the inner product of K1 and K2 (i.e., dot product), Y1·Y2 represents the inner product of Y1 and Y2. And the elements of K1 and K2 satisfy: $K1_i = (X1_i \cdot X2_i) \times Y1_i$, $K2_i = (X1_i - X2_i) \times Y2_i$. Herein, $X1_i$, $X2_i$, $Y1_i$, $Y2_i$, $K1_i$, $K2_i$ represent the i-th element of vectors X1, X2, Y1, Y2, K1, K2.

Therefore, when the degree of coincidence between the first confidence vector and the second confidence vector is greater than or equal to the preset threshold, the similarity between the first face and the second face is obtained by calculating the distance. Further, it may be determined whether the first face and the second face belong to the same person according to the calculated similarity, for example, if the calculated similarity is greater than or equal to a similarity threshold, it is determined the first face and the second face belong to the same person; otherwise, it is determined that they do not belong to the same person.

In order to more clearly understand the above embodiments, the following description is made by way of example.

It is assumed that the first feature vector of the first face without occlusion is (0.5, 0.5, 0.5, 0.5, 0.5), the first confidence vector is (1, 1, 1, 1, 1). It is assumed that the second feature vector of the second face without occlusion is (0, 1, 0, 1, 0), and the second confidence vector is (1, 1, 1, 1, 1). In this case, the degree of coincidence of the two confidence vectors is 5, and the distance between the first feature vector and the second feature vector is 0.25 according to the above formula. That is to say, when the first face and the second face are both unobstructed, the distance is 0.25.

If the first face and the second face each have different degrees of occlusion, it is assumed that the upper half of the first face is occluded, the first two dimensional features of the first feature vector bring great noise, the first feature vector with occlusion is (0, 1, 0.5, 0.5, 0.5), and the first confidence vector is (0, 0, 1, 1, 1). It is assumed that the lower half of the second face is occluded, it brings great noise to the last two dimensional features of the second feature vector, the second feature vector with occlusion is (0, 1, 0, 0.5, 0.5), and the second confidence vector is (1, 1, 1, 0, 0). In this case, the degree of coincidence of the two confidence vectors is calculated to be 1. If the preset threshold is greater than 1, such as 2 or 3, since the degree of coincidence is less than the preset threshold, the first face and the second face are not comparable at this time, and the distance needs not to be calculated. If the preset threshold is less than 1, such as 0.5 or 0.8, since the degree of coincidence is greater than the preset threshold, the distance may be calculated to be 0.25. That is to say, when the first face and the second face are both partially occluded, the distance is still 0.25.

It can be seen that, as for the same two faces, the calculated distance in different occlusion states is constant. That is, the distance calculated in conjunction with the confidence in the embodiment of the present disclosure is independent of the occlusion state, that is, the calculated distance is not changed due to face occlusion, so that the accuracy of facial recognition is higher.

Figure 3:
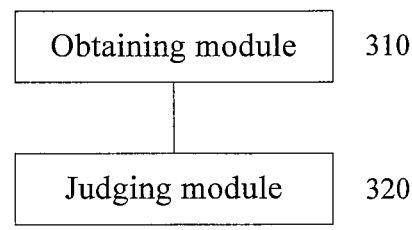
FIG. 3 is a schematic block diagram of an apparatus for facial recognition according to an embodiment of the present disclosure.

FIG. 3 is a schematic block diagram of an apparatus for facial recognition according to an embodiment of the present disclosure. The apparatus 30 in FIG. 5 comprises: an obtaining module 310 and a judging module 320.

The obtaining module 310 is configured to obtain a first feature vector of a first face in a first facial image and a first confidence vector having the same dimension as the first feature vector, wherein elements in the first confidence vector are used to indicate credibility of features represented by the corresponding elements in the first feature vector; and the obtaining module is further configured to obtain a second feature vector of a second face in a second facial image and a second confidence vector having the same dimension as the second feature vector, wherein elements in the second confidence vector are used to indicate credibility of features represented by the corresponding elements in the second feature vector.

The judging module 320 is configured to determine, according to the first feature vector, the first confidence vector, the second feature vector and the second confidence vector, whether the first face and the second face belong to the same person.

Exemplarily, the determining module 320 may comprise a calculating sub-module 3210 and a determining sub-module 3220. The calculating sub-module 3210 is configured to calculate a degree of coincidence between the first confidence vector and the second confidence vector. If the degree of coincidence calculated by the calculating sub-module 3210 is less than a preset threshold, the determining sub-module 3220 determines that it is impossible to determine whether the first face and the second face belong to the same person. If the degree of coincidence calculated by the calculating sub-module 3210 is greater than or equal to the preset threshold, the calculating sub-module 3210 calculates a similarity between the first face and the second face according to the first confidence vector, the first feature vector, the second confidence vector and the second feature vector, and the determining sub-module 3220 determines whether the first face and the second face belong to the same person according to the similarity.

Exemplarily, the calculating sub-module 3210 may be specifically configured to obtain the degree of coincidence by calculating an inner product of the first confidence vector and the second confidence vector.

Exemplarily, the calculating sub-module 3210 may be specifically configured to calculate a distance between the first face and the second face according to the first confidence vector, the first feature vector, the second confidence vector and the second feature vector; and calculate a similarity between the first face and the second face according to the distance.

The calculating sub-module 3210 may be specifically configured to calculate the distance using the following formula:

$$D = \frac{<(X1-X2)*Y1, (X1-X2)*Y2>}{<Y1, Y2>},$$

where X1 represents the first feature vector, X2 represents the second feature vector, Y1 represents the first confidence vector, Y2 represents the second confidence vector, < > represents calculating an inner product, and * represents multiplying by bit.

Optionally, the above formula may also be expressed as $$D = \frac{K1 \cdot K2}{Y1 \cdot Y2},$$

where

K1, K2, Y1, Y2 are vectors in the same dimension, K1·K2 represents the inner product of K1 and K2 (i.e., dot product), Y1·Y2 represents the inner product of Y1 and Y2. And the elements of K1 and K2 satisfy: $K1_i=(X1_i-X2_i)\times Y1_i$, $K2_i=(X1_i-X2_i)\times Y2_i$. Herein, $X1_i$, $X2_i$, $Y1_i$, $Y2_i$, $K1_i$, $K2_i$ represent the i-th element of vectors X1, X2, Y1, Y2, K1, K2.

The calculating sub-module 3210 may be specifically configured to calculate the similarity using the following formula:

$$S = \frac{1}{1+e^{A\times D+B}},$$

where S represents the similarity, D represents the distance, and A and B are preset parameters.

Exemplarily, the determining sub-module 3220 may be specifically configured to determine that the first face and the second face belong to the same person if the similarity is greater than or equal to a similarity threshold; determine that the first face and the second face do not belong to the same person if the similarity is less than the similarity threshold.

Exemplarily, the obtaining module 310 may be specifically configured to input the first facial image into a trained neural network to obtain the first feature vector and the first confidence vector; input the second facial image to the trained neural network to obtain the second feature vector and the second confidence vector.

Exemplarily, a training module may be further comprised to obtain a trained neural network by means of training according to a face sample data set.

The apparatus 30 shown in FIG. 3 can implement the facial recognition method shown in FIG. 2, in order to avoid repetition, no more details are repeated herein.

Figure 4:
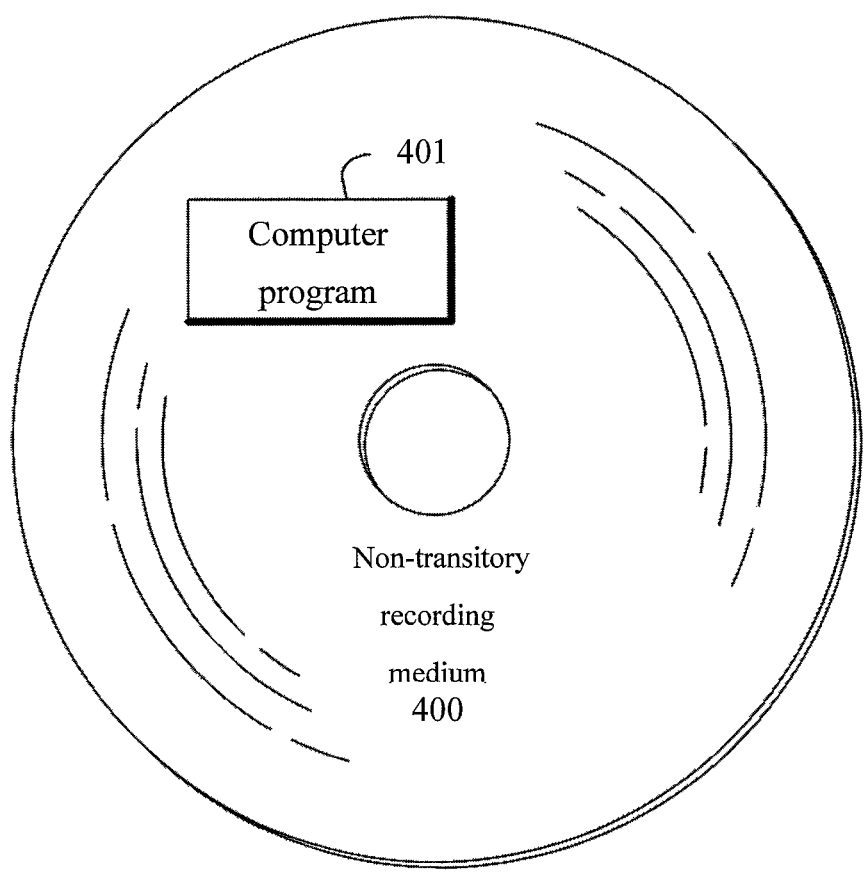
FIG. 4 shows a schematic diagram of a non-transitory recording medium provided by an embodiment of the present disclosure.

FIG. 4 shows a schematic diagram of a non-transitory recording medium according to an embodiment of the present disclosure. As shown in FIG. 4, the non-transitory recording medium 400 according to an embodiment of the present disclosure stores a computer program 401, steps of the face recognition method illustrated in the above are carried out when the computer program 401 is executed by a computer.

In addition, an embodiment of the present disclosure further provides another facial recognition system, comprising a memory, a processor, and a computer program stored in the memory and running on the processor, wherein steps of the facial recognition method according to FIG. 2 are carried out when the processor implements the computer program.

In addition, an embodiment of the present disclosure further provides an electronic device, the electronic device may comprise the apparatus 30 as shown in FIG. 3. The facial recognition method shown in FIG. 2 may be achieved by the electronic device.

The embodiments of the present disclosure provide a method, apparatus and facial recognition system, and a non-transitory recording medium, credibility of respective elements in the corresponding feature vector can be represented by the confidence vector, and further, similarity between two faces can be jointly calculated based on the feature vector and the confidence vector, which can avoid the feature vector unavailability situation caused by face occlusion, and the similarity obtained by this method is independent of the occlusion state, thereby ensuring the accuracy of facial recognition.

Although exemplary embodiments of the present disclosure have been described with reference to the drawings, it should be understood that, these exemplary embodiments are merely illustrative, not intended to limit the scope of the present disclosure thereto. A person of ordinary skill in the art may make various changes and modifications, thereto, without departing from the scope and spirit of the present disclosure. All of these changes and modifications are intended to be included in the scope of the present disclosure as required based on the claims attached thereto.

A person of ordinary skill in the art may be aware that, units and algorithm steps described as examples in combination with the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

In the several embodiments provided in the present disclosure, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another apparatus, or some features may be ignored or not performed.

The description provided here has illustrated a lot of specific details. However, it should be understood that, the embodiments of the present disclosure can be practiced without these specific details. In some embodiments, the well-known methods, structures and techniques are not illustrated in detail, so that the description will not be obscure to be understood.

Similarly, it should be understood that, in order to simplify the present disclosure and help to understand one or more of various aspects of the present disclosure, the various features of the present disclosure, in the aforesaid description of illustrative embodiments of the present disclosure, are sometimes grouped into a single embodiment, drawing, or description thereof. However, the disclosed method should not be explained as reflecting the following intention: i.e. the invention sought for protection claims more features than the features clearly defined in any claim. To put more precisely, as is reflected in the following claims, the inventive point contains less features than all the features of a single embodiment disclosed hereinbefore. Therefore, the claims complying with a specific embodiment are explicitly incorporated into the specific embodiment, wherein every claim itself acts as an individual embodiment of the present disclosure.

A person skilled in the art can understand that, except that at least some of these features and/or process or units are exclusive to each other, any combinations can be adopted to combine all the features disclosed by the description (including the attached claims, abstract and drawings) and any method or all process of the device or unit disclosed as such. Unless there is explicit statement, every feature disclosed by the present description (including the attached claims, abstract and drawings) can be replaced by substitute feature providing the same, equivalent or similar purpose.

In addition, a person skilled in the art can understand that, although some embodiments described here comprise some features instead of other features included in other embodiments, the combination of features of different embodiments are deemed as falling into the scope of the present disclosure and forming different embodiments. For example, in the claims, any one of the embodiments sought for protection can be used in various combination modes.

The various components embodiments of the present disclosure can be realized by hardware, or realized by software modules running on one or more processors, or realized by combination thereof. A person skilled in the art should understand that, microprocessor or digital signal processor (DSP) can be used for realizing some or all functions of some or all components of the devices for presenting relevant information of accessed website according to the embodiments in the present disclosure in practice.

The present disclosure can also realize one part of or all devices or programs (for example, computer programs and computer program products) used for carrying out the method described here. Such programs for realizing the present disclosure can be stored in computer-readable medium, or can possess one or more forms of signal. Such signals can be downloaded from the Internet website or be provided at signal carriers, or be provided in any other forms.

It should be noticed that, the forgoing embodiments are intended to illustrate the present disclosure and are not for limiting the present disclosure, and a person skilled in the art can design substitute embodiments without departing from the scope of the appended claims. In the claims, any reference marks between brackets should not be construed as limit for the claims. The word "comprise" does not exclude elements or steps that are not listed in the claims. The word "a" or "one" before the elements does not exclude the existence of a plurality of such elements. The present disclosure can be realized by means of hardware comprising several different elements and by means of properly programmed computer. In the unit claims listing several devices, several of the devices can be embodied by a same hardware item. The use of words "first", "second" and "third" does not mean any sequence. These words can be explained as name.

The above is only the specific implementations of the present disclosure or the description of the specific embodiments, and the scope of the present disclosure is not limited thereto, and all changes or substitutions that can be easily conceived of by a person skilled in the art should be included within the technical scope of the present disclosure. The scope of the present disclosure should be determined by the scope of the claims.

What is claimed is:

1. A facial recognition method, the method comprising:

obtaining a first feature vector of a first face in a first facial image and a first confidence vector having the same dimension as the first feature vector, wherein elements in the first confidence vector are used to indicate credibility of features represented by the corresponding elements in the first feature vector;

obtaining a second feature vector of a second face in a second facial image and a second confidence vector having the same dimension as the second feature vector, wherein elements in the second confidence vector are used to indicate credibility of features represented by the corresponding elements in the second feature vector; and determining, according to the first feature vector, the first confidence vector, the second feature vector and the second confidence vector, whether the first face and the second face belong to the same person, wherein determining, according to the first feature vector, the first confidence vector, the second feature vector and the second confidence vector, whether the first face and the second face belong to the same person comprises:

calculating a degree of coincidence between the first confidence vector and the second confidence vector; and if the degree of coincidence is less than a preset threshold, determining that it is impossible to determine whether the first face and the second face belong to the same person;

if the degree of coincidence is greater than or equal to the preset threshold, calculating a similarity between the first face and the second face according to the first confidence vector, the first feature vector, the second confidence vector and the second feature vector, and determining whether the first face and the second face belong to the same person according to the similarity.

2. The method according to claim 1, wherein calculating a degree of coincidence between the first confidence vector and the second confidence vector comprises:
obtaining the degree of coincidence by calculating an inner product of the first confidence vector and the second confidence vector.

3. The method according to claim 1, wherein calculating a similarity between the first face and the second face according to the first confidence vector, the first feature vector, the second confidence vector and the second feature vector comprises:
calculating a distance between the first face and the second face according to the first confidence vector, the first feature vector, the second confidence vector and the second feature vector; and
calculating a similarity between the first face and the second face according to the distance.

4. The method according to claim 3, wherein the distance is calculated using the following formula:

$$D = \frac{<(X1-X2)*Y1,(X1-X2)*Y2>}{<Y1,Y2>},$$

where X1 represents the first feature vector, X2 represents the second feature vector, Y1 represents the first confidence vector, Y2 represents the second confidence vector, < > represents calculating an inner product, and * represents multiplying by bit.

5. The method according to claim 3, wherein the similarity is calculated using the following formula:

$$S = \frac{1}{1+e^{A \times D + B}},$$

where S represents the similarity, D represents the distance, and A and B are preset parameters.

6. The method according to claim 1, wherein obtaining a first feature vector of a first face in a first facial image and a first confidence vector having the same dimension as the first feature vector comprises:
inputting the first facial image into a trained neural network to obtain the first feature vector and the first confidence vector; and
wherein obtaining a second feature vector of a second face in a second facial image and a second confidence vector having the same dimension as the second feature vector comprises:
inputting the second facial image to the trained neural network to obtain the second feature vector and the second confidence vector.

7. A facial recognition system, comprising a memory, a processor, and a computer program stored in the memory and running on the processor, wherein steps of a facial recognition method are implemented when the computer program is executed by the processor, the method comprising:
obtaining a first feature vector of a first face in a first facial image and a first confidence vector having the same dimension as the first feature vector, wherein elements in the first confidence vector are used to indicate credibility of features represented by the corresponding elements in the first feature vector;
obtaining a second feature vector of a second face in a second facial image and a second confidence vector having the same dimension as the second feature vector, wherein elements in the second confidence vector are used to indicate credibility of features represented by the corresponding elements in the second feature vector; and
determining, according to the first feature vector, the first confidence vector, the second feature vector and the second confidence vector, whether the first face and the second face belong to the same person,
wherein determining, according to the first feature vector, the first confidence vector, the second feature vector and the second confidence vector, whether the first face and the second face belong to the same person comprises:
calculating a degree of coincidence between the first confidence vector and the second confidence vector; and
if the degree of coincidence is less than a preset threshold, determining that it is impossible to determine whether the first face and the second face belong to the same person;
if the degree of coincidence is greater than or equal to the preset threshold, calculating a similarity between the first face and the second face according to the first confidence vector, the first feature vector, the second confidence vector and the second feature vector, and determining whether the first face and the second face belong to the same person according to the similarity.

8. The system according to claim 7, wherein calculating a degree of coincidence between the first confidence vector and the second confidence vector comprises:
obtaining the degree of coincidence by calculating an inner product of the first confidence vector and the second confidence vector.

9. The system according to claim 7, wherein calculating a similarity between the first face and the second face according to the first confidence vector, the first feature vector, the second confidence vector and the second feature vector comprises:
calculating a distance between the first face and the second face according to the first confidence vector, the first feature vector, the second confidence vector and the second feature vector; and
calculating a similarity between the first face and the second face according to the distance.

10. The system according to claim 9, wherein the distance is calculated using the following formula:

$$D = \frac{<(X1-X2)*Y1,(X1-X2)*Y2>}{<Y1,Y2>},$$

where X1 represents the first feature vector, X2 represents the second feature vector, Y1 represents the first confidence vector, Y2 represents the second confidence vector, < > represents calculating an inner product, and * represents multiplying by bit.

11. The system according to claim 9, wherein the similarity is calculated using the following formula:

$$S = \frac{1}{1+e^{A \times D + B}},$$

where S represents the similarity, D represents the distance, and A and B are preset parameters.

12. The system according to claim 7, wherein obtaining a first feature vector of a first face in a first facial image and a first confidence vector having the same dimension as the first feature vector comprises:
inputting the first facial image into a trained neural network to obtain the first feature vector and the first confidence vector; and
obtaining a second feature vector of a second face in a second facial image and a second confidence vector having the same dimension as the second feature vector comprises:
inputting the second facial image to the trained neural network to obtain the second feature vector and the second confidence vector.

13. A non-transitory recording medium on which a computer program is stored, wherein steps of a facial recognition method are implemented when the computer program is executed by a processor, the method comprising:
obtaining a first feature vector of a first face in a first facial image and a first confidence vector having the same dimension as the first feature vector, wherein elements in the first confidence vector are used to indicate credibility of features represented by the corresponding elements in the first feature vector;
obtaining a second feature vector of a second face in a second facial image and a second confidence vector having the same dimension as the second feature vector, wherein elements in the second confidence vector are used to indicate credibility of features represented by the corresponding elements in the second feature vector; and
determining, according to the first feature vector, the first confidence vector, the second feature vector and the second confidence vector, whether the first face and the second face belong to the same person,
wherein determining, according to the first feature vector, the first confidence vector, the second feature vector and the second confidence vector, whether the first face and the second face belong to the same person comprises:
calculating a degree of coincidence between the first confidence vector and the second confidence vector; and
if the degree of coincidence is less than a preset threshold, determining that it is impossible to determine whether the first face and the second face belong to the same person;
if the degree of coincidence is greater than or equal to the preset threshold, calculating a similarity between the first face and the second face according to the first confidence vector, the first feature vector, the second confidence vector and the second feature vector, and determining whether the first face and the second face belong to the same person according to the similarity.

14. The non-transitory recording medium according to claim 13, wherein calculating a degree of coincidence between the first confidence vector and the second confidence vector comprises:
obtaining the degree of coincidence by calculating an inner product of the first confidence vector and the second confidence vector.

15. The non-transitory recording medium according to claim 13, wherein calculating a similarity between the first face and the second face according to the first confidence vector, the first feature vector, the second confidence vector and the second feature vector comprises:
calculating a distance between the first face and the second face according to the first confidence vector, the first feature vector, the second confidence vector and the second feature vector; and
calculating a similarity between the first face and the second face according to the distance.

16. The non-transitory recording medium according to claim 15, wherein the distance is calculated using the following formula:

$$D = \frac{<(X1-X2)*Y1, (X1-X2)*Y2>}{<Y1,Y2>},$$

where X1 represents the first feature vector, X2 represents the second feature vector, Y1 represents the first confidence vector, Y2 represents the second confidence vector, < > represents calculating an inner product, and * represents multiplying by bit.

17. The non-transitory recording medium according to claim 15, wherein the similarity is calculated using the following formula:

$$S = \frac{1}{1+e^{A \times D + B}},$$

where S represents the similarity, D represents the distance, and A and B are preset parameters.

* * * * *